Patented Nov. 20, 1951

2,575,529

UNITED STATES PATENT OFFICE 2,575,529

PROCESS FOR THE IMPROVEMENT OF VEGETABLE DRYING AND SEMIDRYING OILS

Sol B. Radlove, Newton, Iowa, assignor to The Maytag Company, Newton, Iowa, a corporation of Delaware No Drawing. Application October 29, 1947, Serial No. 782,884

11 Claims. (Cl. 260—405.6)

The present invention relates to a novel process for the improvement of the properties of vegetable drying and semi-drying oils and their derivatives by isomerization and to a novel catalytic treatment thereof.

It is well known in the protective coating industry that properly conjugated vegetable oils dry more rapidly and their films are found to be more durable and more resistant to the action of dilute alkali solutions than those of non-conjugated oils. Vegetable oils, such as linseed, soybean, safflower and sunflower are improved when isomerized under the proper conditions. Moreover, the polymerization rates of the conjugated oils are much faster than those of the non-conjugated oils, thus resulting in a saving of time in drying, lower decomposition losses and improved chemical and physical properties in the final product.

Such conjugated vegetable oils can also be co-polymerized with other conjugated compounds, such as styrene and butadiene, to produce other and valuable protective coatings material.

The process of isomerization applied to vegetable oils involves the treatment of those oils in such a manner as to induce a shift of a portion of the double bonds in the polyethenoid acids, such as linoleic and linolenic acids which are found in such oils, to conjugated positions.

The amount of conjugation induced in any oil may be determined either by its diene number or more accurately by its selective absorption in the ultra-violet spectra when using a Beckman spectrophotometer. The percent conjugation can also be closely approximated by the increase in the refractive index using standardized graphs prepared from data obtained with a Bechman spectrophotometer.

Although vegetable oils have been isomerized by reacting the oils with an excess of aqueous alkali solutions at high temperatures and pressures, acidulating the resulting soaps to recover the isomerized acids and re-esterifying the latter with glycerol, such method has been extremely costly and time consuming.

Another and more recent method of isomerization of these vegetable oils consists in treating these oils with a nickel-activated carbon catalyst yielding an isomerized oil with low viscosity and good color without splitting the triglycerides. However, the cost incurred in preparing and then using this catalyst involves a relatively expensive process. In addition, the nickel-activated carbon catalyst is susceptible to poisoning by acidic material and impurities adsorbed by the carbon during the resulting reaction which decreases the life of the catalyst.

It is, therefore, an object of the present invention to provide a novel method for and manner of isomerizing vegetable oils that is highly efficient and economical in practice, which does not split the triglycerol molecule and which increases the polymerization rate and drying speed of the oil and the resistance of the oil film to dilute alkali solutions.

The present invention further comprehends a novel process in which there is added to the oil to be treated certain catalytic organic compounds and the resulting mixture heated in such manner and under such conditions of time and temperature that undue polymerization does not occur. While the invention can be successfully practiced with the mixture treated in an open vessel or tube the preferred method of isomerizing the oil contemplates the use of a closed tube or vessel. Such conditions of time and temperature depend on the particular catalyst employed, the quantity of such catalyst and the kind of oil being treated.

The present invention further contemplates an improved process for the isomerization of vegetable oil derivatives, such as fat acids and their esters.

Other objects, features, capabilities and advantages are comprehended by the invention, as will later appear and as are inherently possessed thereby.

The catalytic organic compounds which I employ are characterized by having a quinone radical or nucleous

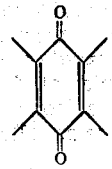

in their structure and are hereafter referred to as quinoid compounds. Among such catalytic compounds, naphthaquinone

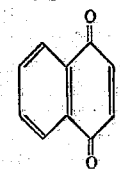

and anthraquinone

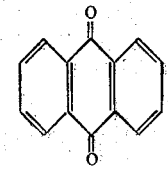

are examples of two and three ring compounds containing a quinone radical or nucleus that may be employed in my novel process for the isomerization of vegetable oils, such as hereinbefore recited. Para benzoquinone is a further illustration of a catalyst adapted to be used for isomerizing such oils but does not have the commercial value of other of the quinoid compounds because of its affinity for the conjugated radicals induced by the isomerization effected in accordance with the present invention. Derivatives of these parent compounds may also be employed in the isomerizing of these vegetable oils. For example, B-chloro-anthraquinone, B-methyl anthraquinone and dihydroxy anthraquinone, all derivatives of anthraquinone, as well as derivatives of other quinoid compounds, can be used in practicing the invention.

One possible explanation of the catalytic action involved is that ring structures containing a quinone nucleus are members of a group of compounds capable of forming reversible oxidation-reduction systems. A measure of the relative stability of these systems is available in the oxido-reduction potentials of the quinones. For example, the system,

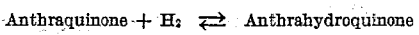
Anthraquinone + $H_2$ ⇌ Anthrahydroquinone has a reduction potential at 25° C. of only .154 volt. This value is extremely low and means that the anthraquinone has little tendency to undergo permanent reduction; that is, its quinoid ring structure is more stable and less prone to change permanently to the aromatic condition which it acquires in the reduced form.

Linoleic and linolenic acid radicals which occur naturally in vegetable oils contain an active methylene group, a $CH_2$ group activated by an unsaturated structure on either side, as shown as follows:

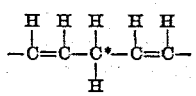

The hydrogen atoms of this group are comparatively active. The anthraquinone, or other members of oxidation-reduction systems react with the hydrogen atoms of this group to form unstable complexes, probably the hydrogen bonded reduced forms of the quinone. These complexes decompose, releasing the quinone and allowing the linoleic and linolenic acids to rearrange to conjugated forms which are more stable than the non-conjugated configurations.

Illustrative examples of the manner in which vegetable oils can be isomerized in accordance with the invention are as follows:

EXAMPLE I

Alkali-refined soybean oil with three parts by weight of a commercial grade of anthraquinone to 100 parts by weight of oil were heated in a closed tube or vessel for a period of about 1.5 hours and at a temperature of 283–287° C. The mixture was then cooled to about 20° C. and the catalyst almost completely recovered by filtration.

The treated soybean oil and an untreated sample of soybean oil were each mixed with driers comprising 0.3% Pb and 0.03% Co (percent metal based on weight of oil) as naphthenates and the constants of the soybean oil before and after such treatment were as follows:

| Refractive Index, 25° C. | Color | Acid V | Viscosity (poises) | Per Cent[1] Conjugation | Set to touch |
|---|---|---|---|---|---|
| BEFORE | | | | | |
| 1.4724 | [2]3 | .12 | 0.5 | 0 | Hours 7¼ |
| AFTER | | | | | |
| 1.4790 | [2]6 | 2.3 | 2.0 | 18.6 | 4 |

[1] The percent conjugation was determined with a Beckman spectrophotometer.
[2] Gardner color scale.

EXAMPLE IA

An alkali-refined linseed oil was treated in a similar manner for approximately 0.5 hr. at 285° C. and was found to contain 21.45% conjugation. When mixed with driers (0.3% Pb and 0.03% Co as naphthenates) as was the soybean oil tested above, the film set-to-touch in 1 hour 25 minutes compared to the original untreated oil mixed with an identical percentage of driers whose film set-to-touch in 4 hours 5 minutes.

The alkali resistance of the conjugated oil films was far greater than that of the original untreated oil films, and the resulting treated oils are particularly applicable for use in paints, varnishes, alkyds, printing inks, oil cloth, linoleum and the like.

One of the major outlets or uses of drying vegetable oils is in the manufacture of paints. To determine the effect of my treatment on oils for use in this field, the following paints were formulated using treated and untreated soybean and linseed oils:

EXAMPLE II

Pigment, total, 58 parts by weight:

| | |
|---|---|
| Titanium dioxide | 8.3 |
| Zinc oxide | 17.5 |
| Basic sulfate of white lead | 24.0 |
| Magnesium silicate | 8.7 |
| Oil | 33.0 |
| Mineral spirits | 9.5 |

Driers: 2% Pb, .04% Co, as naphthenates (percent metal based on weight of oil).

*Set-to-touch times*

| | |
|---|---|
| Soybean oil paint | 8 hr. 45 min. |
| Treated soybean oil paint | 4 hr. 40 min. |
| Linseed oil paint | 5 hr. 10 min. |
| Treated linseed oil paint | 2 hr. 5 min. |

The catalytic activity of various organic quinoid compounds was compared by their effect on soybean oil when heated at 280° C. for 2 hours in a sealed tube and in the proportion of 2 parts by weight of the catalyst to every 100 parts by weight of oil as shown in Example III.

EXAMPLE III

| Compound | Per cent Diene Conjugation |
|---|---|
| 1,2 Naphthaquinone | 10.8 |
| Dihydroxy anthraquinone | 16.6 |
| Anthraquinone | 14.0 |
| B-chloroanthraquinone | 17.2 |
| B-methyl anthraquinone | 12.6 |
| 2-amino anthraquinone | 9.0 |
| Quinone | 3.6 |

Small amounts of triene conjugation, about 0.5%, were detected in some of the experiments above, but the amount was too small to be regarded as of any great importance.

Quinoids can also be prepared by the proper oxidation of parent aromatic compounds such as anthracene, naphthalene, phenanthrene and chrysene. However, all compounds capable of isomerization are not economically feasible due to their relatively greater solubility in the oil after the catalytic action and the relatively greater difficulty in recovering the same for re-use. Most of the compounds which are commercially successful catalysts exhibit a relatively high vapor pressure at the temperatures at which the isomerization is carried out. Therefore, in order to carry out the reaction successfully and without any undue loss of the catalyst by vaporization, I prefer that the reaction be carried out in a closed tube or vessel.

Some of the catalytic compounds such as anthraquinone and B-methyl anthraquinone have the additional advantage of little or no discoloration of the product. However, for dark colored products in paints, varnishes, alkyds, printing inks and in related fields, discoloration is no drawback. I prefer to use anthraquinone for my process because it is easily soluble in the hot oil, isomerizes the material readily and is almost completely recovered by filtration after cooling the reaction mixture. From the economic point of view the almost complete recovery of the anthraquinone is of the greatest importance. The recovery in most cases is about 96% and in large scale operations the percentage would be even higher due to the smaller handling losses involved. One advantage of anthraquinone is that its crystal structure is of such a nature that it may be readily filtered with almost any type of filtration equipment common to the art. Furthermore, the anthraquinone is extremely stable and can be used over and over again without any apparent loss in its ability to isomerize the vegetable oil. However, I do not in any way limit my invention to the use of any one or any combination of quinoid compounds.

A great advantage in my chemical isomerization process is that because the isomerization takes place through a chemical mechanism it is efficient in the presence of oxygen, fat acids, and the impurities which naturally occur in oils and their derivatives.

To illustrate the fact that this process is operable on derivatives of drying and semi-drying oils, the following example is given.

EXAMPLE IV

| Material | Parts by Weight of Anthraquinone per 100 pts. material | Temperature, °C. | Time of Treatment | Conjugation |
|---|---|---|---|---|
| | | | Hours | Per cent |
| Methyl esters of soybean oil | 5 | 285 | 2 | 21.7 |
| Methyl esters of linseed oil | 5 | 285 | 1.0 | 20.6 |
| Soybean fat acids | 5 | 285 | 1.5 | 20.7 |
| Linseed fat acids | 5 | 285 | 1.0 | 19.2 |

To illustrate that the process is operable on the various grades of drying and semi-drying oils, the following examples are given:

EXAMPLE V

| Parts (by weight) of Anthraquinone per 100 parts of oil | Temp., °C. | Time, Minutes | Ref. Index at 25° C. | Viscosity (poises) | Conjugation, Per Cent |
|---|---|---|---|---|---|
| A. ALKALI REFINED SOYBEAN OIL | | | | | |
| 2 | 270 | 280 | 1.4788 | 2.3 | 16.1 |
| 3 | 285 | 75 | 1.4785 | 1.8 | 16.5 |
| 4 | 285 | 90 | 1.4792 | 2.6 | 18.2 |
| 5 | 260 | 280 | 1.4789 | 2.0 | 19.8 |
| 5 | 280 | 120 | 1.4793 | 2.4 | 20.7 |
| 5 | 300 | 160 | 1.4802 | 3.2 | 20.2 |
| 10 | 260 | 180 | 1.4800 | 2.4 | 24.2 |
| 80 | 285 | 10 | 1.4790 | 1.0 | 21.4 |
| B. ALKALI REFINED LINSEED OIL | | | | | |
| 5 | 260 | 135 | 1.4864 | 4.2 | 19.8 |
| 5 | 280 | 60 | 1.4870 | 6.0 | 19.2 |
| 5 | 285 | 30 | 1.4854 | 2.3 | 21.5 |
| 10 | 285 | 20 | 1.4860 | 1.6 | 20.0 |

Various grades of soybean and linseed oils were treated with 5 parts by weight of anthraquinone (commercial grade) per 100 parts of oil. The soybean oils were heated at 290° C. for 70 minutes and the linseed oils at 290° for 30 minutes. A comparison of the oils before and after treatment is given in the following table:

EXAMPLE VI

| Grade of Oil | Physical Constants | Before Treatment | After Treatment |
|---|---|---|---|
| A. SOYBEAN OILS | | | |
| Crude | Conjugation, Per Cent | 0.0 | 19.9 |
| | Viscosity (poises) | 0.5 | 2.8 |
| | Color (Gardner) | 11 | |
| | Ref. Index at 25° C | 1.4732 | 1.4800 |
| | Acid Value | 0.9 | 6.8 |
| Non-break | Conjugation, Per Cent | 0.0 | 20.3 |
| | Viscosity (poises) | 0.5 | 2.9 |
| | Color (Gardner) | 10 | 7 |
| | Ref. Index at 25° C | 1.4729 | 1.4800 |
| | Acid Value | 1.7 | 4.9 |
| Alkali refined | Conjugation, Per Cent | 0.0 | 19.9 |
| | Viscosity (poises) | 0.5 | 3.0 |
| | Color (Gardner) | 3 | 7 |
| | Ref. Index at 25° C | 1.4729 | 1.4802 |
| | Acid Value | 0.1 | 3.9 |
| B. LINSEED OILS | | | |
| Crude | Conjugation, Per Cent | 0.0 | 16.9 |
| | Viscosity (Poises) | 0.3 | 2.3 |
| | Color (Gardner) | 11 | 9 |
| | Ref. Index at 25° C | 1.4790 | 1.4838 |
| | Acid Value | 1.8 | 4.3 |
| Non-break | Conjugation, Per Cent | 0.0 | 19.0 |
| | Viscosity (Poises) | 0.3 | 3.0 |
| | Color (Gardner) | 11 | 10 |
| | Ref. Index at 25° C | 1.4788 | 1.4859 |
| | Acid Value | 3.3 | 5.9 |
| Alkali refined | Conjugation, Per Cent | 0.0 | 18.7 |
| | Viscosity (Poises) | 0.3 | 2.5 |
| | Color (Gardner) | 5 | 6 |
| | Ref. Index at 25° C | 1.4788 | 1.4857 |
| | Acid Value | 0.3 | 2.3 |

Where the crude and non-break oils were used some break material precipitated out and on filtering remained behind with the anthraquinone. In my preferred process where the catalyst is used over and over again it is preferable that the break material be removed prior to its use in the process. Due to its relatively low price, the water washed soybean oil could thus be treated and still be more economical to use than alkali-refined oil which sells at a premium. Moreover, the isomerizations are successful even when carried out in the open air.

The operating conditions which govern the amount of isomerization induced in any oil are (1) percent of catalyst, (2) temperature, and (3) time, and increasing the amount of the catalyst increases the rate of catalytic action when all other factors are held constant. The solubility of anthraquinone in soybean oil at a temperature of about 280° C. is extremely high, over 100 parts in 100 parts of oil. However, after soybean oil has been heated with 5 parts of anthraquinone per 100 parts of oil at 285° C. for 1.5 hours, the reaction mixture tends to become somewhat viscous on cooling due to the crystallization of the anthraquinone. When higher concentrations of catalyst are used the resultant reaction mixtures possess even higher viscosities causing difficulty in the filtration operation, but if suitable means and procedures are used, recovery of the catalyst can be secured. For example, the catalyst may be recovered from high percentage catalyst mixtures by dilution with a solvent such as carbon tetrachloride in which the oil is soluble and the anthraquinone rather insoluble. By distilling off the carbon tetrachloride after filtration the oil may be recovered.

The time and temperature of the reaction are closely related. With the same percent of catalyst, the higher the temperature, the shorter the time of treatment. The isomerization reaction starts slowly at about 250° C. and increases as the temperature is raised. For an all purpose oil, the object therefore is to produce an oil with the lowest viscosity and the greatest amount of conjugation. To produce such an oil, the conditions set forth in Example I are representative, although such example is not to be taken as in any way limiting the operating conditions since it is possible to obtain oils with excellent characteristics by varying combination of the time and temperature of the reaction. However, at temperatures above 310–315° C., I have found that reaction periods should be very short to prevent excessive decomposition of the oil.

The polymerization rate of the treated oils was also far greater than that of the original oils with resulting lower acid number indicating lower decomposition losses. In Example VII are listed the comparative results of polymerizing soybean and linseed oils at 304°–308° C. before and after my treatment.

EXAMPLE VII

| Oil | Hours of Heating | Acid Value | Viscosity (poises) |
|---|---|---|---|
| Alkali-refined Soybean | 15.0 | 30.4 | 23 |
| Treated Soybean | 5.5 | 13.5 | 46 |
| Alkali-refined Linseed | 5.5 | 12.8 | 27 |
| Treated Linseed | 1.0 | 4.7 | 28 |

This rapid rate of polymerization is of great value where heavy bodied oils are used such as for linoleum, varnishes, and printing inks.

There may remain dissolved in the treated oil extremely small amounts of the anthraquinone catalyst which on heating the treated oil, sublimes and collects in the exhaust tube in the form of small crystals. However, on removing the residual catalyst by an activated carbon treatment, the polymerization rates before and after this treatment are essentially the same, indicating that the small amount of residual catalyst has little or no effect on the polymerization rate.

My chemical isomerization process may be operated either by the batch, continuous, or a combination of both methods. For obvious economic reasons, the continuous method is preferred.

While I have herein disclosed several illustrative examples of the invention, it is to be understood that the invention is not limited thereto but may comprehend other preparations, details, features and method steps without departing from the spirit of the invention.

It is claimed:

1. The process of producing the catalytic isomerization of vegetable drying and semi-drying oils and their derivatives comprising the step of heating the oil at a temperature of from 250° to 315° C. in the presence of an organic compound having a chemical structure including a quinone radical, said organic compound being present in the amount of approximately 2 to 5 parts by weight to each 100 parts of the oil treated.

2. The process of producing the catalytic isomerization of vegetable drying and semi-drying oils and their derivatives comprising the step of heating the oil at a temperature of from 250° to 315° C. in the presence of anthraquinone, said anthraquinone being present in the amount of approximately 2 to 5 parts by weight to each 100 parts of the oil treated.

3. The process of producing the catalytic isomerization of vegetable drying and semi-drying oils and their derivatives comprising the step of heating the oil at a temperature of from 250° to 315° C. in the presence of anthraquinone, said anthraquinone being present in the amount of approximately 2 to 5 parts by weight to each 100 parts of the oil treated, and recovering said anthraquinone.

4. The process of producing the catalytic isomerization of vegetable drying and semi-drying oils and their derivatives comprising the step of heating the oil at a temperature above 250° C. in the presence of an organic compound having a chemical structure including a quinone radical, said organic compound being present in the amount of approximately 2 to 5 parts by weight to each 100 parts of the oil treated.

5. The process of producing the catalytic isomerization of vegetable drying and semi-drying oils and their derivatives comprising the step of heating the oil at a temperature in the neighborhood of 285° C. in the presence of a quinoid material serving as a catalytic agent, said quinoid material being present in the amount of approximately 2 to 5 parts by weight to each 100 parts of the oil treated.

6. The process of producing the catalytic isomerization of vegetable drying and semi-drying oils and their derivatives comprising the step of heating the oil at a temperature of from 250° to 315° C. in the presence of an organic compound having a chemical structure including a quinone radical and which is soluble in said oil at said temperatures, said organic compound being present in the amount of approximately 2 to 5 parts by weight to each 100 parts of the oil treated.

7. The process of producing the catalytic isomerization of vegetable drying and semi-drying oils and their derivatives comprising the step of heating the oil at a temperature of from 250° to 315° C. in the presence of an organic compound having a chemical structure including a quinone radical and which is soluble in said oil at said temperatures but which becomes substantially insoluble at a lower temperature above the solidification point of said oil, said organic compound being present in the amount of approximately 2 to 5 parts by weight to each 100 parts of the oil treated.

8. The process of producing the catalytic isomerization of soy-bean oil comprising the step of heating the oil at a temperature of from 250° to 315° C. in the presence of an organic compound having a chemical structure including a quinone radical, said organic compound being present in the amount of approximately 2 to 5 parts by weight to each 100 parts of the oil treated.

9. The process of producing the catalytic isomerization of linseed oil comprising the step of heating the oil at a temperature of from 250° to 315° C. in the presence of an organic compound having a chemical structure including a quinone radical, said organic compound being present in the amount of approximately 2 to 5 parts by weight to each 100 parts of the oil treated.

10. The process of producing the catalytic isomerization of vegetable drying and semi-drying oils and their derivatives comprising the step of heating the oil at a temperature above 250° C. in the presence of an organic compound having a chemical structure including a quinone radical, said compound being present in the amount of at least 2 parts by weight to each 100 parts of the oil treated whereby a substantial catalytic effect upon the isomerization of the oil is obtained during heating.

11. The process of producing the catalytic isomerization of vegetable drying and semi-drying oils and their derivatives comprising the step of heating the oil at a temperature above 250° C. in the presence of an organic compound selected from the group consisting of anthraquinone, 1,2 naphthoquinone, dihydroxy anthraquinone, beta chloroanthraquinone, beta methyl anthraquinone and 2-amino anthraquinone, said compound being present in the amount of at least 2 parts by weight to each 100 parts of the oil treated whereby a substantial catalytic effect upon the isomerization of the oil is obtained during heating.

SOL B. RADLOVE.

REFERENCES CITED

The following references are of record in the file of this patent:

UNITED STATES PATENTS

| Number | Name | Date |
|---|---|---|
| 2,207,686 | Schwarcman | July 9, 1940 |
| 2,213,935 | Sorensen et al. | Sept. 3, 1940 |
| 2,230,470 | Schwarcman | Feb. 4, 1941 |
| 2,340,745 | Hanford et al. | Feb. 1, 1944 |
| 2,384,298 | Green | Sept. 4, 1945 |
| 2,419,528 | Biegel | Apr. 29, 1947 |
| 2,435,695 | Plank | Feb. 10, 1948 |